US008589514B2

(12) United States Patent
Duggal et al.

(10) Patent No.: US 8,589,514 B2
(45) Date of Patent: Nov. 19, 2013

(54) METHODS AND APPARATUS FOR PROVIDING PEER-TO-PEER DATA NETWORKING FOR WIRELESS DEVICES

(75) Inventors: Nakul Duggal, San Diego, CA (US); Premkumar Jothipragasam, San Diego, CA (US); Nikihil Jain, San Diego, CA (US); Paul E. Jacobs, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1444 days.

(21) Appl. No.: 11/202,805

(22) Filed: Aug. 12, 2005

(65) Prior Publication Data

US 2006/0262785 A1 Nov. 23, 2006

Related U.S. Application Data

(60) Provisional application No. 60/683,389, filed on May 20, 2005.

(51) Int. Cl.
*G06F 15/16* (2006.01)

(52) U.S. Cl.
USPC ............................ 709/219; 709/203; 709/206

(58) Field of Classification Search
USPC ................. 709/219, 227–228, 203–206, 217; 370/277–278
See application file for complete search history.

(56) References Cited

U.S. PATENT DOCUMENTS 6,865,191 B1 3/2005 Bengtsson et al.
7,489,781 B2 * 2/2009 Klassen et al. ................ 380/270
8,117,277 B2 * 2/2012 Nikiel et al. .................. 709/217
2001/0015977 A1 8/2001 Johansson
2001/0053687 A1 12/2001 Sivula
2003/0055893 A1 * 3/2003 Sato et al. ..................... 709/204
2003/0112823 A1 * 6/2003 Collins et al. ................. 370/474
2003/0115326 A1 * 6/2003 Verma et al. .................. 709/225

(Continued)

FOREIGN PATENT DOCUMENTS

EP 1385323 A1 1/2004
JP 2002223313 8/2002
JP 2007508766 4/2007
WO WO2005039132 4/2005

OTHER PUBLICATIONS

International Search Report and Written Opinion—PCT/US2006/019638 , International Search Authority—European Patent Office—May 10, 2006.

*Primary Examiner* — Joshua Joo
(74) *Attorney, Agent, or Firm* — Abdollah Katbab

(57) ABSTRACT

A system for a server-less peer-to-peer data network for content transfer between wireless devices is described. The system includes a first wireless device having a first address and content, and a second wireless device. The first wireless device transmits a message including the first address over a first service. The second wireless device receives the message from the first wireless device and establishes a communication path to the first address over a second service to receive the content from the first wireless device. A method embodiment includes transmitting a message from a first wireless device to a second wireless device over a first service, wherein the message includes a first address. The method further includes establishing, by the second wireless device, a communication path over a second service to the first address to receive content from the first wireless device after receiving the message from the first wireless device.

22 Claims, 9 Drawing Sheets

(56) References Cited

U.S. PATENT DOCUMENTS

2003/0122922 A1* 7/2003 Saffer et al. ................ 348/14.01
2003/0142654 A1* 7/2003 Chambers et al. ............ 370/338
2005/0010677 A1* 1/2005 Krissell ......................... 709/232
2005/0165726 A1* 7/2005 Kawell et al. ..................... 707/1
2005/0220041 A1* 10/2005 Lin ............................... 370/278
2005/0256909 A1* 11/2005 Aboulhosn et al. ........... 707/200
2006/0126501 A1* 6/2006 Ramaswamy ................ 370/221
2006/0173932 A1* 8/2006 Cortright et al. .............. 707/204

* cited by examiner

METHODS AND APPARATUS FOR PROVIDING PEER-TO-PEER DATA NETWORKING FOR WIRELESS DEVICES

CLAIM OF PRIORITY UNDER 35 U.S.C. §119

The present Application for patent claims priority to Provisional Application No. 60/683,389 entitled "METHODS AND APPARATUS FOR PROVIDING PEER-TO-PEER DATA NETWORKING FOR WIRELESS DEVICES" filed May 20, 2005, and assigned to the assignee hereof and hereby expressly incorporated by reference herein.

FIELD

The disclosed embodiments relate to peer-to-peer networking for wireless devices.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device. Because of such severe resource constraints, it is often typically desirable, for example, to maintain a limited size and quantity of software applications and other information residing on such remote personal computing devices, e.g., client devices.

FIG. 1 depicts a prior approach to such application execution on a wireless device in order to route data files between wireless devices 100, 102 connected to a communication network 104, e.g., a code division multiple access (CDMA) network, a general packet radio service (GPRS) network, a universal mobile telecommunications system (UMTS) network, or other network. As depicted, data file communication between wireless devices 100, 102 prior to the present embodiments requires the use of a multimedia server (MMS) 108, also connected with communication network 104, in order to distribute the data files from one wireless device to another wireless device.

FIG. 2 depicts operation of FIG. 1 in the form of a message sequence diagram. Specifically, originating wireless device 100 establishes a data call connection with communication network 104 (sequence steps 21, 22, 23) and then transmits the data file to the MMS 108 (sequence step 24), which may include an indication of the destination, i.e., wireless device 102. After receipt of the data file from wireless device 100, MMS 108 notifies destination wireless device 102 of the presence of the data file on the MMS by way of a short message service (SMS) message (sequence step 25), for example.

After receipt of the SMS message from MMS 108, wireless device 102 establishes a data call connection with communication network 104 (sequence steps 26, 27, 28). After establishing the data call connection, wireless device 102 downloads the data file from MMS 108 (sequence step 29). After completing download of the data file, wireless device 102 transmits an acknowledgement (sequence step 30) to MMS 108. In response, MMS 108 transmits an acknowledgement (sequence step 31) to wireless device 100 thereby indicating transmission of the data file to the specified destination, i.e., wireless device 102.

As described, transmission of the data file from wireless device 100 to wireless device 102 requires the use of a multimedia server 108 for storage and retransmission of the data file. By following this approach, additional hardware in the form of MMS 108 computer system connected with communication network 104 is required for storing the data file prior to transmission to the destination. Additionally, message sequence steps are required for both the upload (transmission from wireless device 100 to MMS 108) and download (transmission from MMS 108 to wireless device 102) of the data file.

SUMMARY

The present embodiments provide server-less peer-to-peer data networking for content transfer between wireless devices.

A system embodiment for a peer-to-peer data network for wireless devices includes a first wireless device having a first address and content, and a second wireless device. The first wireless device is configured to transmit a message including the first address over a first service. The second wireless device is configured to receive the message from the first wireless device and establish a communication path over a second service to the first address and sub-address to receive the content from the first wireless device.

A method embodiment of communicating content between first and second wireless devices includes the steps of transmitting a message from a first wireless device to a second wireless device over a first service, wherein the message includes a first address and establishing, by the second wireless device, a communication path over a second service to the first address and sub-address to receive content from the first wireless device after receiving the message from the first wireless device.

A further method embodiment of communicating content on a peer-to-peer data network includes transmitting a message including an address to a wireless device over a first service, establishing a communication path over a second service with the wireless device based on a received request at the address, and transmitting content via the established communication path.

A further method embodiment of communicating content on a peer-to-peer data network includes establishing a communication path over a first address to an address based on a received message from a wireless device including the address, wherein the received message is received over a second service, and receiving content, via the established communication path, from the address and sub-address.

A wireless-device processor embodiment for a peer-to-peer data network includes a processor configured to transmit a message including an address over a first service, establish a communication path over a second service with a wireless device based on a received request at the address, and transmit content from the memory to the established communication path.

A further wireless-device processor for a peer-to-peer data network, includes a processor configured to establish a communication path over a first address to an address of a wireless device based on a received message including the address received over a second service, and receive content, via the established communication path, from the address and sub-address.

In a further embodiment, a memory or a computer-readable medium stores instructions which, when executed by a processor, cause the processor to transmit a message including an address over a first service, establish a communication path over a second service with a wireless device based on a received request at the address, and transmit content from the memory to the established communication path.

In a further embodiment, a memory or a computer-readable medium stores instructions which, when executed by a processor, cause the processor to receive a message including a first address of a wireless device over a first service, establish a communication path over a second service to the first address and, based on the received message, receive content from the first address and via the established communication path.

In a further embodiment, a method of communicating content between a first wireless device and a computer platform includes transmitting a message from a first wireless device over a first service, and establishing, by the first wireless device, a communication path over a second service to a computer platform to transmit content from the first wireless device after a predetermined time period has elapsed. The message includes a first address and has an intended destination of a second wireless device.

In a further embodiment, a method of communicating content between a computer platform and a first wireless device includes receiving a message from a second wireless device over a first service, and establishing, by the first wireless device, a communication path over a second service to the computer platform to receive content from the computer platform. The message includes a first address of a computer platform.

Still other advantages of the disclosed embodiments will become readily apparent to those skilled in the art from the following detailed description, wherein the preferred embodiments are shown and described, simply by way of illustration of the best mode contemplated of carrying out the embodiments. As will be realized, the embodiments are capable of other and different embodiments, and the several details are capable of modifications in various obvious respects, all without departing from the embodiments. The advantages of the disclosed embodiments may also be realized and attained by the means of the instrumentalities and combinations particularly pointed out in the appended claims.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

The mechanism according to an embodiment provides a peer-to-peer communication of content between wireless devices using a communication network. In particular, the present embodiments enable wireless devices to set up peer-to-peer communication paths to exchange content, e.g., voice, text, video, and other multimedia content, without requiring a dedicated network server. Further, embodiments enable wireless devices to set up communication paths using different services, e.g., short message service and packet data service.

Figure 1:
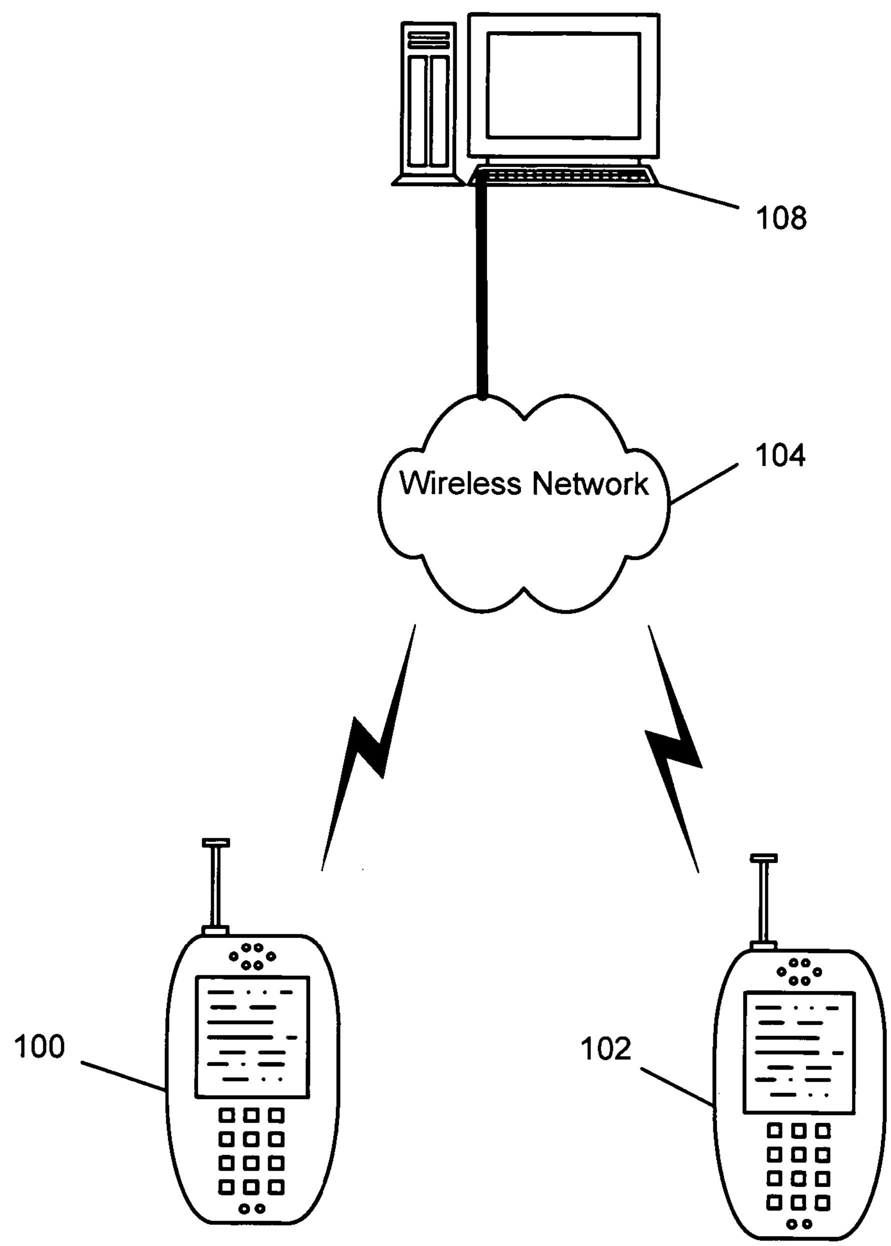
FIG. 1 is a high level diagram of a prior approach communication network.
Figure 2:
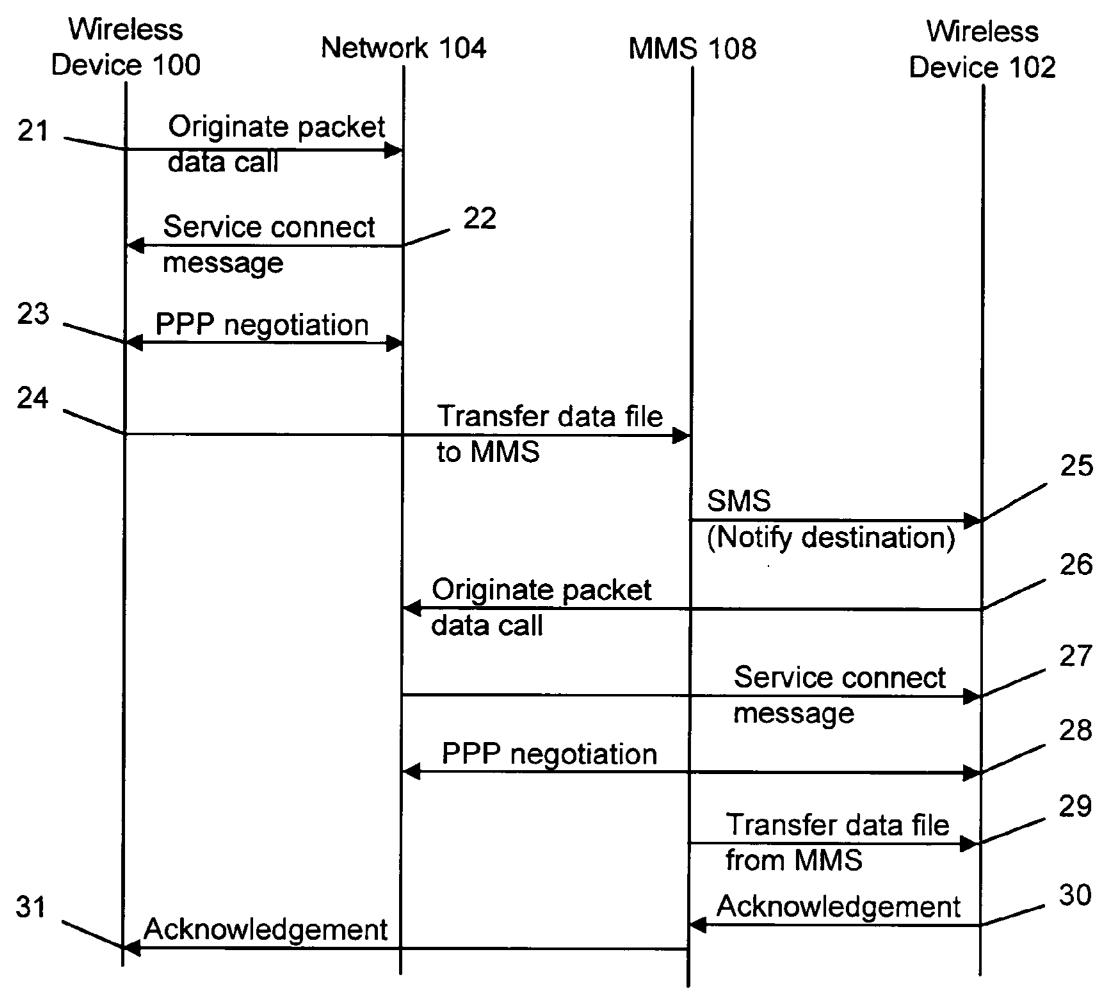
FIG. 2 is a message sequence chart of operation of the prior approach of FIG. 1.
Figure 3:
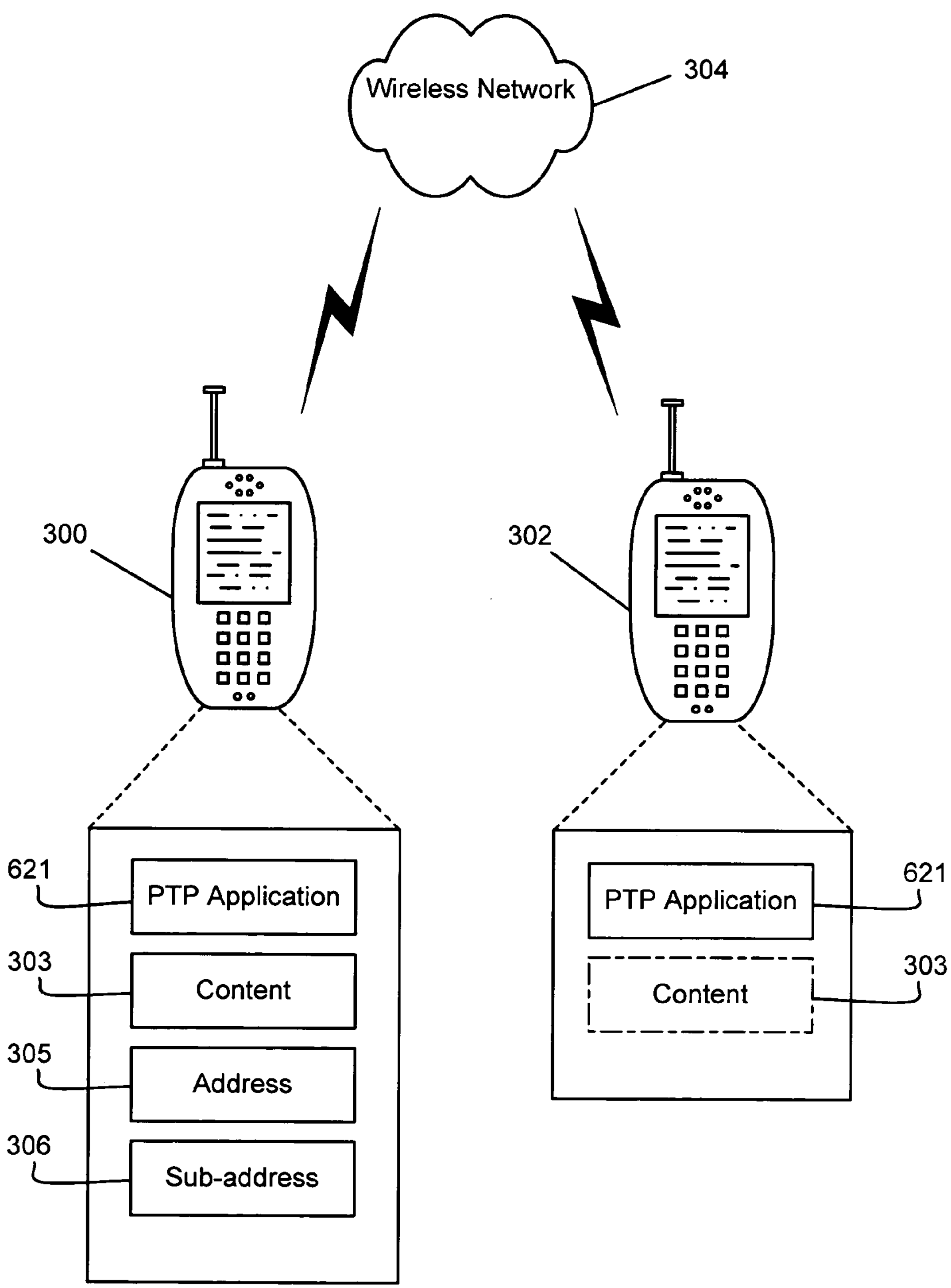
FIG. 3 is a high level diagram of a communication network according to an embodiment.

FIG. 3 depicts an embodiment for routing content 303, e.g., data files, between two wireless devices 300, 302 connected to a communication network 304, e.g., a CDMA network, a GPRS network, a UMTS network, and other types of communication networks. A peer-to-peer (PTP) application 621, i.e., a set of executable instructions, resident on each wireless device 300, 302, is executable to effect an exchange of content 303 between wireless devices 300, 302. As depicted, communication of content 303 between wireless devices 300, 302 occurs without requiring a dedicated network server, e.g., a MMS 108 (FIG. 1). Further, as depicted, wireless device 302 may include content 303 (dash-dot line) for communication to wireless device 300. Further, as described below, communication of a message regarding transfer of content 303 between wireless devices 300, 302 is signaled using a separate service, e.g., in the form of a short message service (SMS) message, from the service used to transfer the content, e.g., in the form of a packet data connection.

Figure 4:
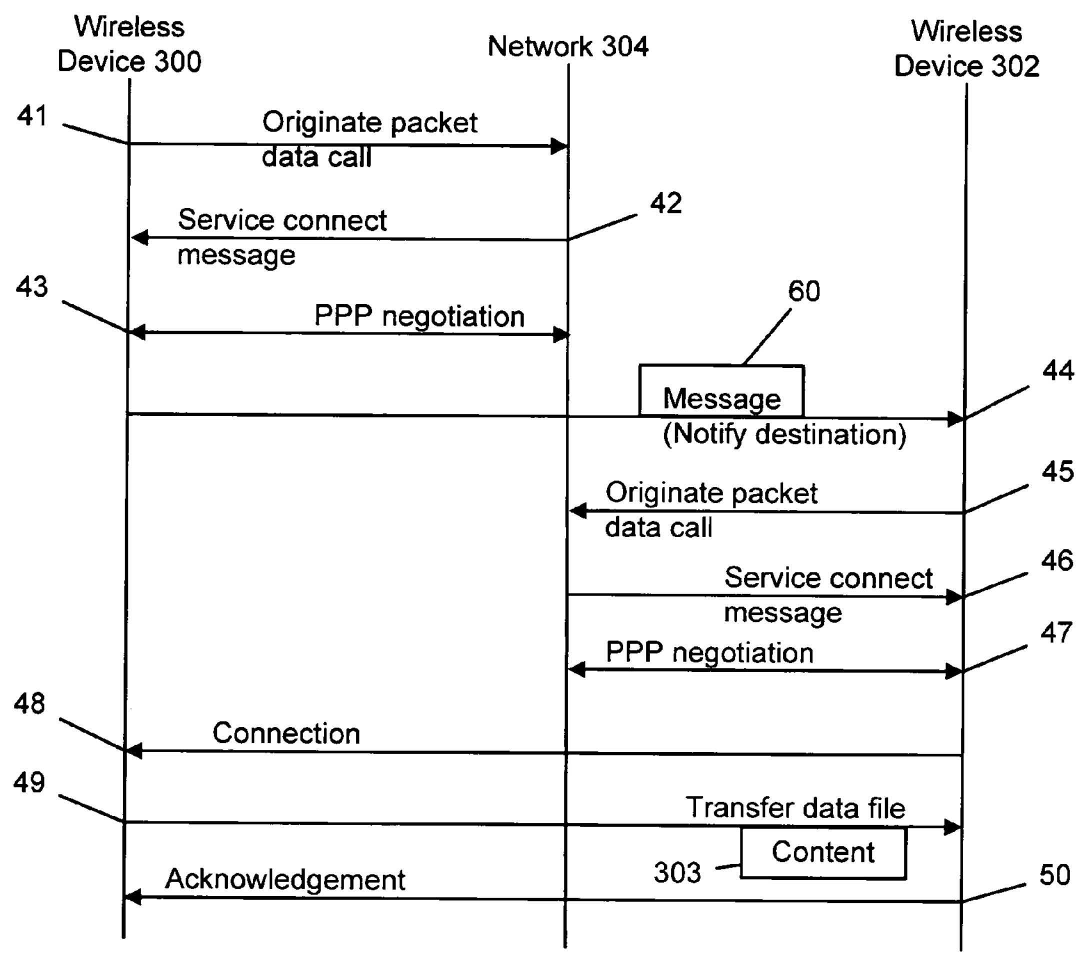
FIG. 4 is a message sequence chart of operation of the FIG. 3 embodiment.

FIG. 4 depicts operation of the FIG. 3 embodiment in the form of a message sequence diagram. Originating wireless device 300 establishes a data call connection with communication network 304 (sequence steps 41, 42, 43). During establishment of the data call connection, wireless device 300 obtains a network address 305, e.g., an Internet Protocol (IP) address, designating the address of the wireless device on communication network 304. After establishing the data call connection, execution of PTP application 621 by wireless device 300 causes the wireless device to transmit (sequence step 44) a message 60, e.g., an SMS message, to destination wireless device 302 using communication network 304.

Message 60 includes an indication of content 303, e.g., by use of a particular message title, subject, type, or other mechanism, to be communicated from wireless device 300 to wireless device 302. Message 60 also includes the address 305 of wireless device 300 as well as a predetermined secondary address or sub-address 306, e.g., a port number, at the wireless device address 305. In an embodiment, sub-address 306 is a set value specified for such content transfers. In another embodiment, sub-address 306 is a random value determined prior to transmission of message 60. In another embodiment, message 60 omits an indication of content 303 to be transferred and includes only the address 305 to which wireless device 302 connects, as described below. In an embodiment, message 60 is transmitted using a short message service such as an SMS message.

In a still further embodiment, message 60 content is encrypted to prevent eavesdropping of the message content. In another embodiment, message 60 content is digitally signed to prevent tampering with the message content.

Returning to the description of the FIG. 4 message sequence diagram, after receipt of message 60, wireless device 302 establishes a data call connection with communication network 304 (sequence steps 45, 46, 47). In an embodiment, data call connection with communication network 304 uses a different service from the transmission of message 60, e.g., a packet data service. After establishing the data call connection, wireless device 302 establishes a connection, such as a socket connection, with wireless device 300, at address 305 and sub-address 306 specified in message 60, using communication network 304 (sequence step 48). The term socket connection includes a communication connection between two uniquely identified endpoints. In an embodiment, the connection setup includes the exchange of encryption information, e.g., public and private key pairs. In respective embodiments, the exchange of encryption information occurs using the service of message 60, e.g., SMS messages, or content communication, e.g., the established data connection described immediately above.

After a connection is established, PTP application 621 on each wireless device 300, 302 are executed by the wireless device to communicate using the connection (sequence step 49), e.g., a packet data service connection. As such, wireless device 302 downloads content 303 from wireless device 300 using the established connection over communication network 304. In an embodiment, the content 303 transferred between wireless devices 300, 302 is encrypted. After completing download of content 303 from wireless device 300, wireless device 302 transmits an acknowledgement (sequence step 50) to the originating wireless device thereby indicating completion of the transfer.

Figure 5:
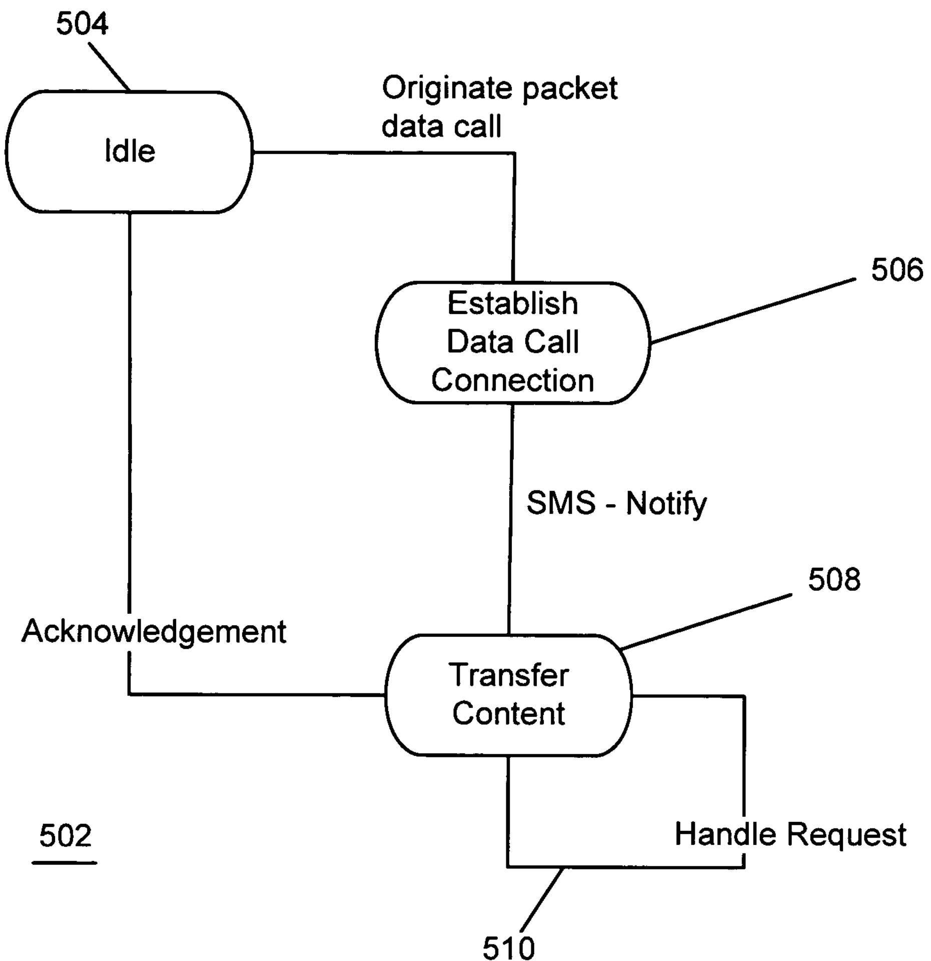
FIG. 5 is a high level functional flow chart of a portion of the process flow of a wireless device of FIG. 3.

FIG. 5 depicts a high level functional block diagram of a portion 502 of the process flow of operation of wireless device 300 in accordance with the FIG. 4 embodiment. As depicted in FIG. 5, wireless device 300 process flow begins operation in an idle state 504. At the beginning of the process flow, an originating packet data call is placed to network 304 (sequence step 41 of FIG. 4) and the flow transitions to an establish data call connection step 506. During step 506, wireless device 300 performs the sequence of steps 41-43 as described above with respect to FIG. 4.

After establishing the data call connection, wireless device 300 transmits the message 60 described above to destination wireless device 302 using network 304, and the process flow transitions to a transfer content step 508. As described above with respect to FIG. 4, in an embodiment, message 60 is transmitted using a different service from the established data call connection, e.g., using an SMS message as opposed to packet data. During step 508, wireless device 300 performs the sequence of steps 48, 49 as described above with respect to FIG. 4. Specifically, for an incoming request from a destination wireless device 302, wireless device 300 executes a handle request transition 510 to handle accepting and establishing the socket connection (sequence step 48 of FIG. 4) and transfer the content 303 (sequence step 49 of FIG. 4).

After receipt of an acknowledgement from destination wireless device 302, the process flow transitions from step 508 to idle state 504. It will be understood that in different embodiments different sequences of steps and transitions may be used to accomplish the embodiments described above. For example, message 60 may be transmitted to multiple destination wireless devices requiring the handling of multiple requests for the specified content 303. According to this embodiment, the transition from step 508 to step 504 may occur after either receipt of a number of requests corresponding to the number of transmitted messages 60 or a predetermined timeout period.

Additionally, in another embodiment, wireless device 300 transitions from step 508 to idle state 504 without receipt of an acknowledgement from destination wireless device 302, e.g., after a predetermined time period has elapsed, etc. In a still further embodiment, the acknowledgement may be received from wireless device 302 using the same service as message 60, e.g., an SMS message, instead of over the packet data service.

Further, although the foregoing discussion describes the transfer of content 303 from an origination wireless device to a destination wireless device, the transfer direction may, in one or more embodiments, occur in the other direction and/or bi-directionally. That is, destination wireless device 302 may connect to and transfer content 303 to originating wireless device 300 and/or the wireless devices 300, 302 may transfer content to each other without requiring an intermediate server for storing the content to be transferred.

Figure 8:
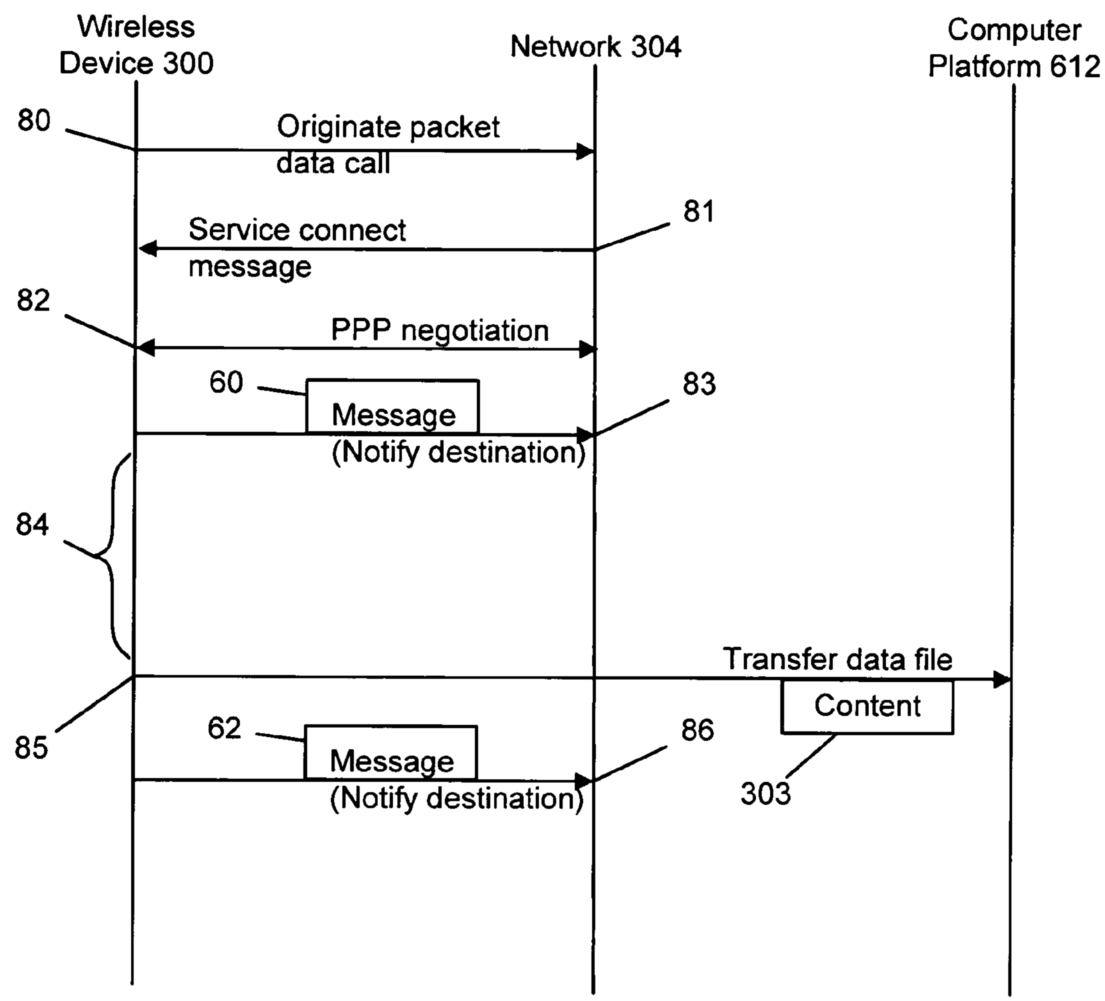
FIG. 8 is a message sequence chart of operation of a second embodiment.

FIG. 8 depicts operation of a second embodiment in the form of a message sequence diagram. According to the second embodiment, a computer platform 612 (FIG. 6 described below), e.g., a desktop computer, laptop computer, etc., is used to provide a failover location for storage of content 303 in the event destination wireless device 302 is unavailable to transfer files with originating wireless device 300.

Originating wireless device 300 establishes a data call connection with communication network 304 (sequence steps 80, 81, 82). During establishment of the data call connection, wireless device 300 obtains a network address 305, e.g., an IP address, designating the address of the wireless device on communication network 304. After establishing the data call connection, e.g., a packet data service connection, execution of PTP application 621 by wireless device 300 causes the wireless device to transmit (sequence step 83) a message 60, e.g., an SMS message as described above, to network 304 intended for wireless device 302 (not shown); however, wireless device 302 is not connected to network 304 at the time. Message 60 is as described above.

After a predetermined time period has elapsed without receiving a connection request, e.g., connection 48 of FIG. 4, from destination wireless device 302, as indicated by reference numeral 84, wireless device 300 transfers the content 303 to computer platform 612 (sequence step 85). According to the second embodiment, computer platform 612 to which the content 303 is transferred is a user-designated device connected with wireless network 604 or wired network 616 (both described with reference to FIG. 6 below) and reachable by wireless device 300 via network 304. That is, computer platform 612 is a failover option to which originating wireless device 300 may transfer the content 303 destined for destination wireless device 302. For example, computer platform 612 may be a user-designated desktop computer or laptop computer connected with the Internet. Further, in keeping with the above-described embodiment, the content 303 transferred to computer platform 612 may be encrypted.

Finally, originating wireless device 300 transmits a message 62, similar to message 60, to network 304 and destined for destination wireless device 302. Message 62 includes the address of computer platform 612 to which the content 303 has been transferred, thereby allowing destination wireless device, upon connection to network 304, to obtain the content 303 from the computer platform.

Figure 9:
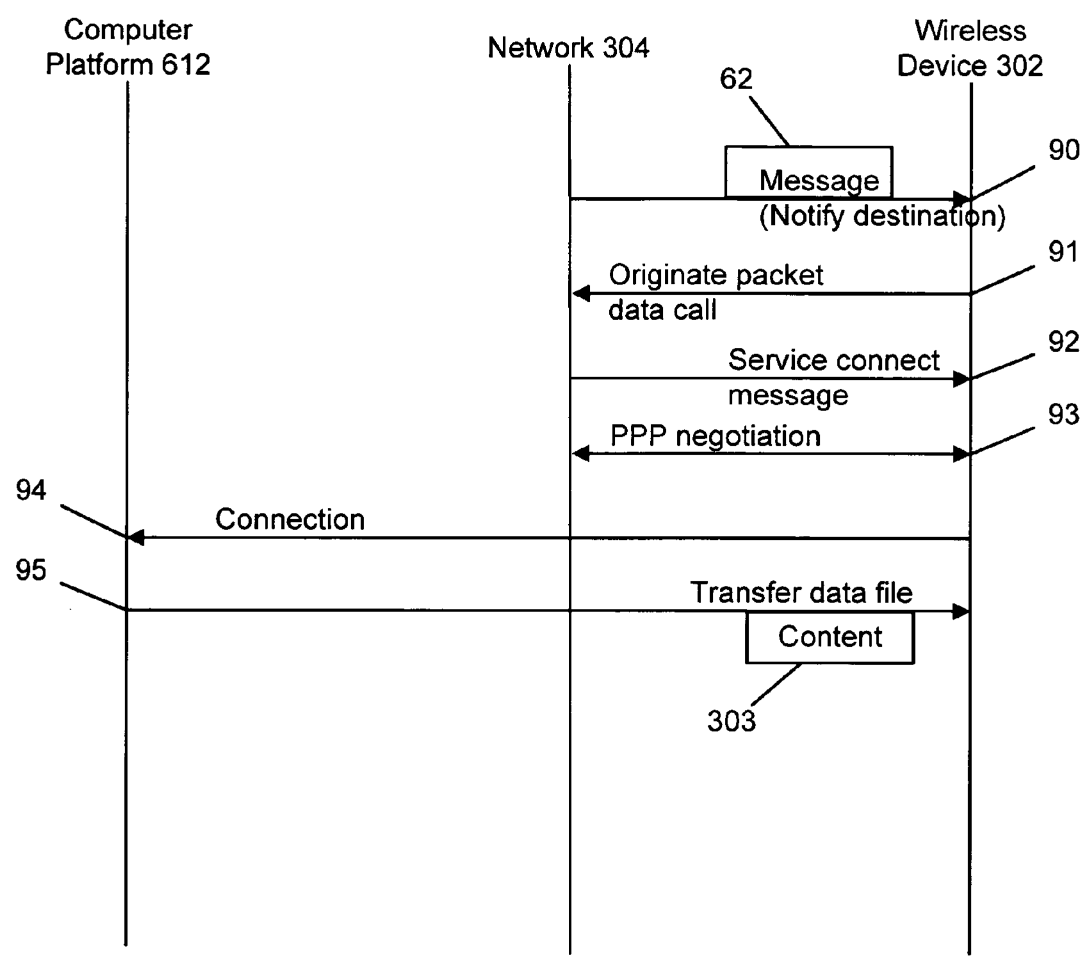
FIG. 9 is a message sequence chart of operation of a second embodiment.

FIG. 9 depicts a message sequence diagram of the retrieval by destination wireless device 302 of the content 303 from computer platform 612. Network 304 transmits (sequence step 90) message 62 to destination wireless device 302. Message 62 includes an indication of content 303, e.g., by use of a particular message title, subject, type, or other mechanism, to be communicated from computer platform 612 to destination wireless device 302. Message 62 includes the address of computer platform 612, as well as, a predetermined secondary address at the computer platform.

After receipt of message 62 by way of short message service, destination wireless device 302 establishes a data call connection with communication network 304 (sequence steps 91, 92, 93). After establishing the data call connection, wireless device 302 establishes a connection with computer platform 612 using communication network 304 (sequence step 94). After a connection is established, destination wireless device 302 executes PTP application 621 to communicate using the connection. As such, destination wireless device 302 downloads content 303 from computer platform 612.

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless® (BREW®) developed by Qualcomm, Inc., of San Diego, Calif. BREW® is sometimes described as a thin veneer existing over a computing device's (typically a wireless cellular phone) operating system, which, among other features, provides interfaces to hardware features particularly found on personal computing devices. BREW® is further characterized by, at least, the one advantage of being able to be provided on such personal computing devices at a relatively low cost with respect to demands on such device resources and with respect to the price paid by consumers for devices containing the BREW® API. Other features known to be associated with BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

One or more embodiments are used in conjunction with a runtime environment (API) executing on the computing device. One such runtime environment (API) is Binary Runtime Environment for Wireless® (BREW®) software previously discussed. However, one or more of the described embodiments can be used with other types of runtime environments (APIs) that, for example, operate to control the execution of applications on wireless client computing devices.

Figure 6:
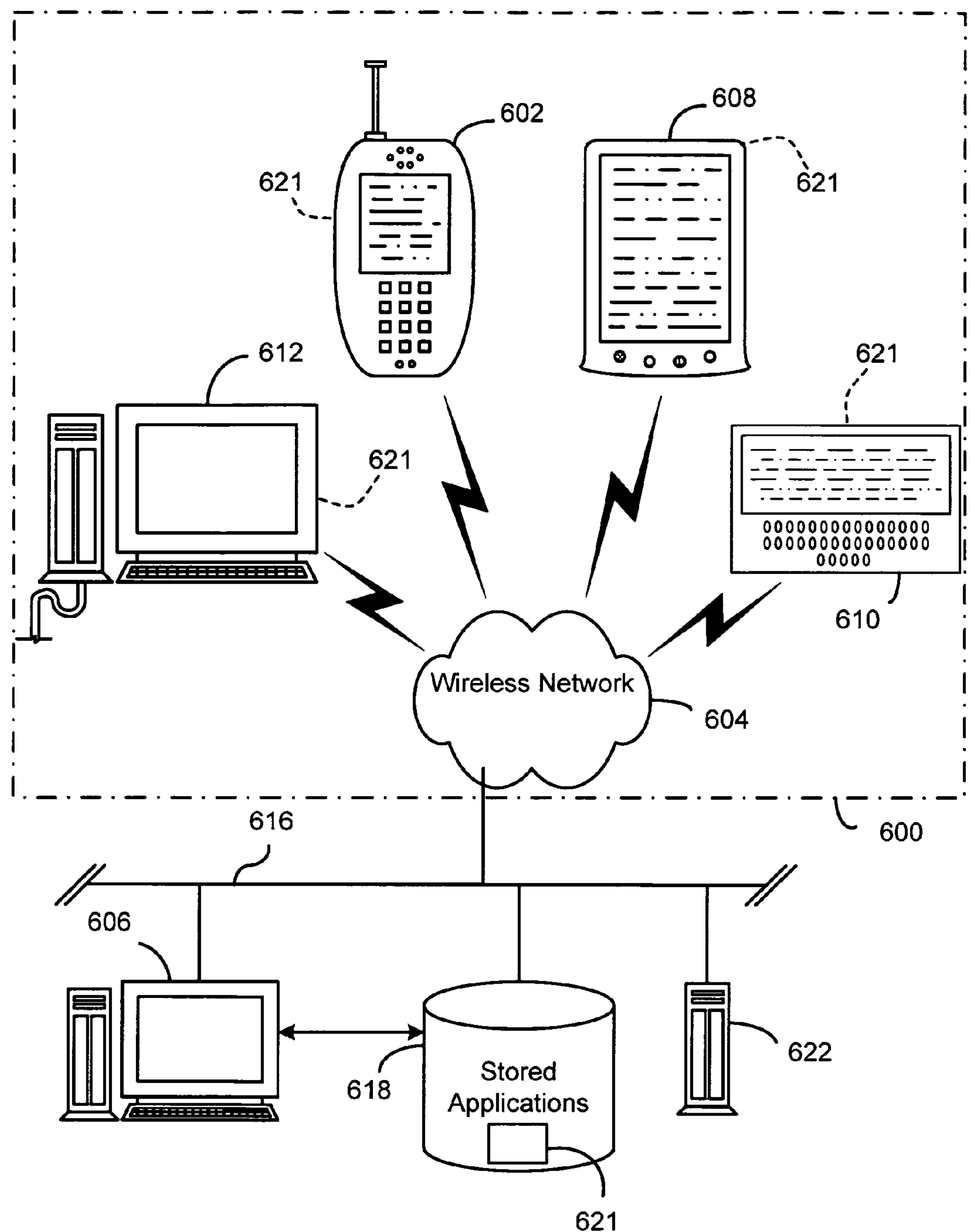
FIG. 6 is a diagram of a wireless network architecture that supports client devices and servers in accordance with at least one embodiment.

FIG. 6 illustrates a block diagram of one exemplary embodiment of a wireless system 600. System 600 can contain client devices, such as cellular telephone 602, in communication across a wireless network 604 with at least one application download server 606 that selectively transmits software applications and components to wireless devices across a wireless communication portal or other data access to the wireless network 604. As shown here, the wireless (client) device can be a cellular telephone 602, a personal digital assistant 608, a pager 610, which is shown here as a two-way text pager, or even a separate computer platform 612 that has a wireless communication portal. For example, wireless device 300 includes a transceiver or communication device for transmitting and receiving data, a processor for executing instructions and controlling operation of the wireless device, and a memory for storing the executable instructions, content 303, address 305, and sub-address 306. The embodiments can thus be realized on any form of client device including a wireless communication portal, e.g., a communication device, including without limitation, wireless modems, PCMCIA cards, personal computers, access terminals, telephones, or any combination or sub-combination thereof.

The application download server 606 is shown here on a network 616 with other computer elements in communication with the wireless network 604. There can be a stand-alone server 622, and each server can provide separate services and processes to the client devices 602, 608, 610, 612 across the wireless network 604. System 600 may also include at least one stored application database 618 that holds the software applications, e.g., a peer-to-peer application 621, that are downloadable by the wireless devices 602, 608, 610, 612 (the peer-to-peer application is indicated as being downloadable to the wireless devices by a dashed line). However, those skilled in the art will appreciate that the configuration illustrated in FIG. 6 is merely exemplary. Accordingly, other embodiments can include one of more servers that can each perform all the described functions and contain all necessary hardware and software, or can contain only selected functionality.

Figure 7:
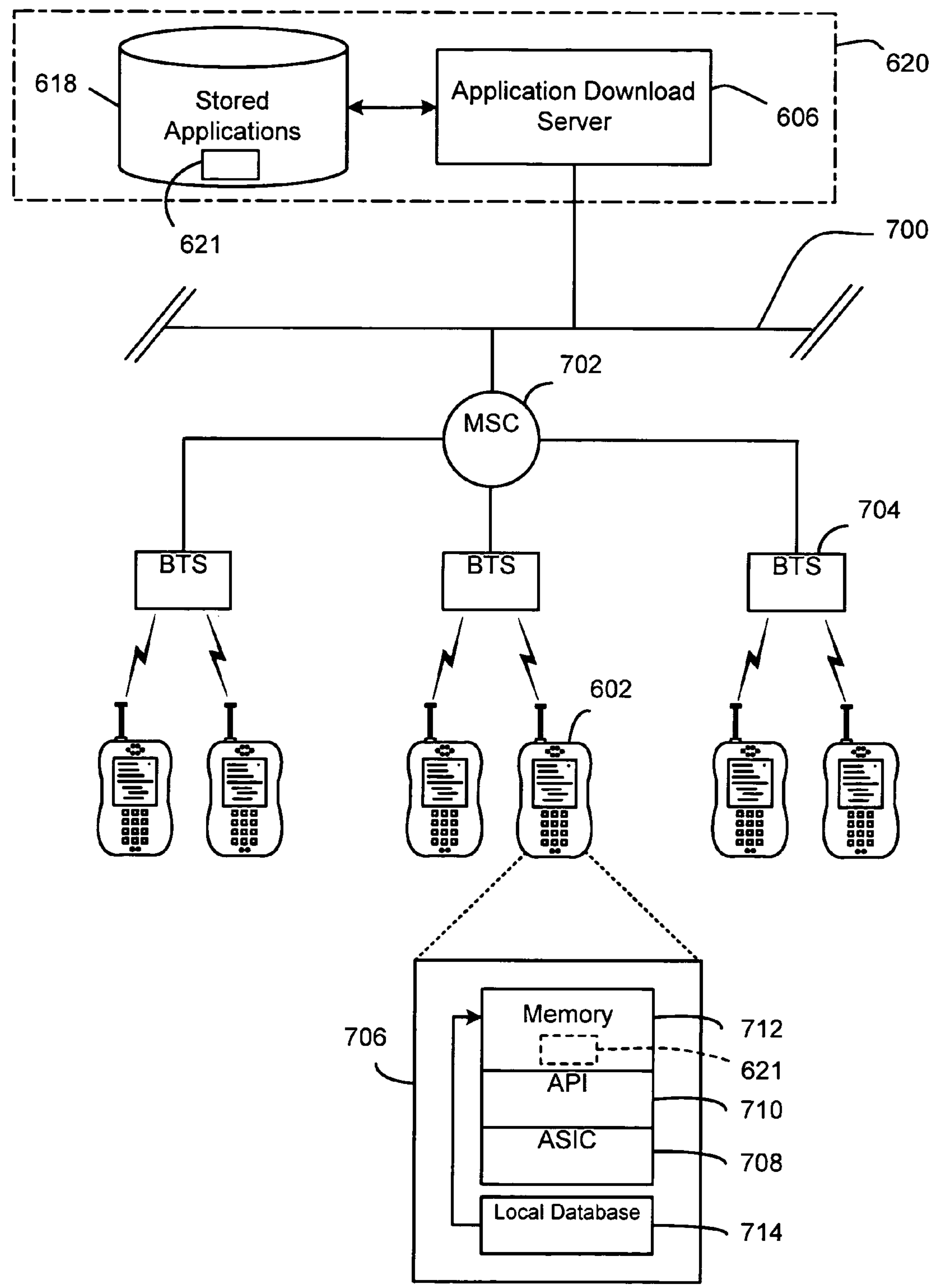
FIG. 7 is a more detailed diagram of a wireless network architecture that supports the client devices and servers in accordance with at least one embodiment.

In FIG. 7, a block diagram is shown that more fully illustrates system 600, including the components of the wireless network 604 and interrelation of the elements of the exemplary embodiments. System 600 is merely exemplary and can include any system whereby remote client devices, such as wireless client computing devices 602, 608, 610, 612 communicate over-the-air between and among each other and/or between and among components connected via a wireless network 604, including, without limitation, wireless network carriers and/or servers. The application download server 606 and the stored application database 618 communicate with a carrier network 700, through a data link, such as the Internet, a secure LAN, WAN, or other network. Stored application database 618 includes a peer-to-peer application 621 according to the above-described embodiments for download to each of the wireless client computer devices 602, 608, 610, 612. Wireless client computer devices 602, 608, 610, 612 download a copy of peer-to-peer application 621 (dashed line) from stored applications database 618. In the embodiment shown, a server 620 can include the application download server 606, distribution server 622 and the stored application database 618. However, these servers can also be independent devices.

Still referring to the embodiment of FIG. 7, carrier network 700 controls messages (generally being data packets) sent to a messaging service controller ("MSC") 702. Carrier network 700 communicates with the MSC 702 through another communications link, such as another network, the Internet, and/or POTS ("plain ordinary telephone system"). Typically, the network or Internet connection between carrier network 700 and MSC 702 transfers data, and the POTS transfers voice information. MSC 702 may be connected to multiple base stations ("BTS") 704, such as by at least one communications link, including both a data network and/or the Internet for data transfer and POTS for voice information. BTS 704 ultimately broadcasts messages wirelessly to the wireless communications devices, such as cellular telephones 602, in an over-the-air protocol such as short messaging service ("SMS"), etc.

In the embodiment of FIG. 7, each wireless device, such as cellular telephones 602, may include a computer platform 706 that can receive and execute software applications and display data transmitted from computer system 620 or other network servers 622. Computer platform 706 may include an application-specific integrated circuit ("ASIC") 708, or other chipset, processor, microprocessor, logic circuit, or other data processing device. ASIC 708 may be installed at the time of manufacture of cellular telephone 602. ASIC 708 or other processor may execute an application programming interface ("API") layer 710 that interfaces with any resident programs, e.g., PTP application 621, in a memory 712 of the wireless device. API 710 is a runtime environment executing on the computing device, or cellular telephone 602 in this case. One such runtime environment is Binary Runtime Environment for Wireless® (BREW®) software, although other runtime environments may be utilized that, for example, operate to control the execution of applications on wireless computing devices. Memory 712, for example, can be comprised of at least one of read-only and random-access memory (RAM and ROM), EPROM, EEPROM, flash cards, and any memory common to computer platforms. The computer platform 706 may also include a local database 714 that can hold the software applications, e.g., PTP application 621, files, or data not actively used in memory 712. Local database 714 may include at least one of flash memory cells, magnetic media, EPROM, EEPROM, optical media, tape, a soft disk, a hard disk, and any other type of secondary or tertiary memory. Thus, in the embodiment of FIG. 7, each cellular telephone 602 may be loaded with applications such as peer-to-peer application 621 and/or data from computer system 620 in accordance with system 600.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of communicating content between a first wireless device and a second wireless device, comprising:

transmitting a message over a first wireless service from the first wireless device, wherein the message includes a first address and the message is destined for the second wireless device;

establishing, by the first wireless device, a communication path over a second wireless service to a computer platform to transmit content from the first wireless device after a predetermined time period has elapsed without receiving a connection request from the second wireless device; and transferring content destined for the second wireless device from the first wireless device to the computer platform via the established communication path, wherein the computer platform is a failover option to which the first wireless device transfers the content destined for the second wireless device.

2. The method of claim 1, wherein the message is at least one of encrypted or signed.

3. The method of claim 1, comprising:

wherein the first wireless device is arranged to transmit the message to the second wireless device using the first wireless service, wherein the first wireless service is different from the second wireless service, and wherein the second wireless service is used for establishing a communication path from the second wireless device to the first address.

4. The method of claim 1, wherein the first wireless service is a short message service.

5. The method of claim 1 wherein the second wireless service is a packet data service.

6. A wireless device processor configured to implement a method for communicating content on a peer-to-peer data network, the method comprising:

transmitting a message over a first wireless service from a first wireless device, wherein the message includes a first address and the message is destined for a second wireless device;

establishing a communication path over a second wireless service to a computer platform to transmit content from the first wireless device after a predetermined time period has elapsed without receiving a connection request from the second wireless device; and transmitting content destined for the second wireless device from the first wireless device to the computer platform via the established communication path, wherein the computer platform is a failover option to which the first wireless device transfers the content destined for the second wireless device.

7. A non-transitory computer-readable storage medium storing instructions which, when executed by a processor, cause the processor to implement a method, the method comprising:

transmitting a message over a first wireless service from a first wireless device, wherein the message includes a first address and the message is destined for a second wireless device;

establishing a communication path over a second wireless service to a computer platform to transmit content from the first wireless device after a predetermined time period has elapsed without receiving a connection request from the second wireless device; and transmitting content destined for the second wireless device from the first wireless device to the computer platform via the established communication path, wherein the computer platform is a failover option to which the first wireless device transfers the content destined for the second wireless device.

8. A wireless device for a peer-to-peer data network, comprising:

transmitting means for transmitting a message over a first wireless service, wherein the message includes a first address and the message is destined for a second wireless device;

establishing means for establishing a communication path over a second wireless service to a computer platform to transmit content from the first wireless device after a predetermined time period has elapsed without receiving a connection request from the second wireless device; and transferring means for transferring content destined for the second wireless device from the first wireless device to the computer platform via the established communication path, wherein the computer platform is a failover option to which the first wireless device transfers the content destined for the second wireless device.

9. A method of communicating content between a first wireless device and a second wireless device, comprising:

receiving, at the first wireless device, a message over a first wireless service, wherein the message includes a first address of a computer platform and an indication of content from the second wireless device stored at the computer platform to be transferred to the first wireless device, wherein the message is based on the content being transferred to the computer platform from the second wireless device after a predetermined time period has elapsed corresponding to the second wireless device failing to receive a connection request from the first wireless device, wherein the computer platform is a failover option to which the first wireless device transfers the content destined for the second wireless device;

establishing, by the first wireless device, a communication path over a second wireless service to the computer platform, based on the first address; and receiving a transfer of the content from the computer platform to the first wireless device using the established communication path.

10. The method of claim 9, wherein the message is at least one of encrypted or signed.

11. The method of claim 9, comprising:

wherein the first wireless device is arranged to receive the message from the second wireless device using the first wireless service, wherein the first wireless service is different from the second wireless service, and wherein the second wireless service is used for establishing a communication path from the second wireless device to the first address.

12. The method of claim 9, wherein the first wireless service is a short message service.

13. The method of claim 9, wherein the second wireless service is a packet data service.

14. A wireless-device processor configured to implement a method for communicating content on a peer-to-peer data network, the method comprising:

receiving, at a first wireless device, a message over a first wireless service, wherein the message includes a first address of a computer platform and an indication of content from a second wireless device stored at the computer platform to be transferred to the first wireless device, wherein the message is based on the content being transferred to the computer platform from the second wireless device after a predetermined time period has elapsed corresponding to the second wireless device failing to receive a connection request from the first wireless device, wherein the computer platform is a failover option to which the first wireless device transfers the content destined for the second wireless device;

establishing, by the first wireless device, a communication path over a second wireless service to the computer platform, based on the first address; and receiving a transfer of the content from the computer platform to the first wireless device using the established communication path.

15. A non-transitory computer-readable storage medium storing instructions which, when executed by a processor, cause the processor to implement a method, the method comprising:

receiving, at a first wireless device, a message over a first wireless service, wherein the message includes a first address of a computer platform and an indication of content from a second wireless device stored at the computer platform to be transferred to the first wireless device, wherein the message is based on the content being transferred to the computer platform from the second wireless device after a predetermined time period has elapsed corresponding to the second wireless device failing to receive a connection request from the first wireless device, wherein the computer platform is a failover option to which the first wireless device transfers the content destined for the second wireless device;

establishing, by the first wireless device, a communication path over a second wireless service to the computer platform, based on the first address; and receiving a transfer of the content from the computer platform to the first wireless device using the established communication path.

16. A wireless device for a peer-to-peer data network, comprising:

receiving means for receiving a message over a first wireless service, wherein the message includes a first address of a computer platform and an indication of content from a second wireless device stored at the computer platform to be transferred to the first wireless device, wherein the message is based on the content being transferred to the computer platform from the second wireless device after a predetermined time period has elapsed corresponding to the second wireless device failing to receive a connection request from the first wireless device, wherein the computer platform is a failover option to which the first wireless device transfers the content destined for the second wireless device;

establishing means for establishing a communication over a second wireless service to the computer platform, based on the first address; and wherein the receiving means further comprises receiving a transfer of the content from the computer platform to the first wireless device using the established communication path.

17. A system for a peer-to-peer communications for wireless devices, comprising:

a computer platform configured for:

establishing a first communication path over a second wireless service between a first wireless device and the computer platform to receive content from the first wireless device after a predetermined time period has elapsed without receiving a connection request from a second wireless device;

receiving content, destined for the second wireless device from the first wireless device, to the computer platform via the established first communication path;

establishing a second communication path over the second wireless service between the second wireless device and the computer platform, based an address of the computer platform; and transmitting the content from the computer platform to the second wireless device using the established second communication path, wherein the computer platform is a failover option to which the first wireless device transfers the content destined for the second wireless device.

18. The system of claim 17, wherein the first and second communication paths are socket connections.

19. The system of claim 17, further comprising transmitting a message to the second wireless device over a first wireless service, wherein the message indicates the content from the first wireless device is stored at the computer platform, wherein the first wireless service is a short message service and wherein the second wireless service is a packet data service.

20. A method of a computer platform communicating content between first and second wireless devices using a communication network, comprising:

establishing a first communication path over a second wireless service between the first wireless device and a computer platform to receive content from the first wireless device after a predetermined time period has elapsed without receiving a connection request from the second wireless device;

receiving content, destined for the second wireless device from the first wireless device, to the computer platform via the established first communication path;

establishing a second communication path over the second wireless service between the second wireless device and the computer platform, based on a address of the computer platform; and transmitting the content from the computer platform to the second wireless device using the established second communication path, wherein the computer platform is a failover option to which the first wireless device transfers the content destined for the second wireless device.

21. The method of claim 20, wherein the second wireless device comprises content, and the method further comprising transmitting the content from the second wireless device to the first wireless device via the computer platform using the established first and second communication paths.

22. The method of claim 20, further comprising transmitting a message to the second wireless device over a first wireless service, wherein the message indicates the content from the first wireless device is stored at the computer platform, wherein the first wireless service is a short message service and wherein the second wireless service is a packet data service.

* * * * *